United States Patent [19]

Alperovich

[11] Patent Number: 5,991,621
[45] Date of Patent: Nov. 23, 1999

[54] OPTIMIZED ROUTING OF CALLS TO ROAMING SUBSCRIBERS WITHIN A TELECOMMUNICATIONS NETWORK

[75] Inventor: Vladimir Alperovich, Dallas, Tex.

[73] Assignee: Ericsson Inc., Research Triangle Park, N.C.

[21] Appl. No.: 08/710,349

[22] Filed: Sep. 16, 1996

[51] Int. Cl.⁶ .................................................. H04Q 7/20
[52] U.S. Cl. ........................ 455/433; 455/445; 455/560
[58] Field of Search .................................. 455/414, 412, 455/456, 422, 432, 435, 445, 455, 560, 524, 428, 433

[56] References Cited

U.S. PATENT DOCUMENTS

| | | | |
|---|---|---|---|
| 5,345,498 | 9/1994 | Mauger | 379/58 |
| 5,406,616 | 4/1995 | Bjorndahl | 379/59 |
| 5,440,614 | 8/1995 | Sonberg et al. | 379/60 |
| 5,467,381 | 11/1995 | Peltonen et al. | 379/58 |
| 5,504,804 | 4/1996 | Widmark et al. | 379/63 |
| 5,506,888 | 4/1996 | Hayes et al. | 379/59 |
| 5,526,400 | 6/1996 | Nguyen | 379/59 |
| 5,544,227 | 8/1996 | Blust et al. | 379/63 |
| 5,713,073 | 1/1998 | Warsta | 455/56.1 |
| 5,745,852 | 4/1998 | Khan et al. | 455/433 |

FOREIGN PATENT DOCUMENTS

| | | |
|---|---|---|
| 0675663 | 10/1995 | European Pat. Off. . |
| WO 95/09514 | 4/1995 | WIPO . |
| WO 96/20574 | 7/1996 | WIPO . |

OTHER PUBLICATIONS

Brini, et al. "International Roaming in Digital Cellular Networks", Procedings of the International Switching Symposium, Yokohama, Oct. 25, 1992, pp. 132–136.

PCT International Search Report, Feb. 25, 1998, File No. PCT US 97/16280.

PTO 99P–358, Translation copy for EP 0675663 A2, Becher et al, 'Method for producing a connection between several networks of a PLMN systems', Jul. 4, 199.

*Primary Examiner*—Nguyen Vo
*Attorney, Agent, or Firm*—Jenkens & Gilchrist, P.C.

[57] ABSTRACT

A calling party subscriber informs the serving telecommunications node that the dialed called party number represents a mobile number. The serving telecommunications node then interrogates the home location register (HLR) associated with the called party mobile station to determine the current location of the called party mobile station. Upon determining the mobile switching center (MSC) currently serving the called party mobile station, the serving telecommunications node then directly establishes a call connection with the serving MSC. The serving MSC then establishes a speech connection over a radio channel with the called party mobile station traveling within its coverage area to enable the calling party terminal to communicate with the called party mobile station.

10 Claims, 8 Drawing Sheets

OPTIMIZED ROUTING OF CALLS TO ROAMING SUBSCRIBERS WITHIN A TELECOMMUNICATIONS NETWORK

CROSS REFERENCE TO RELATED APPLICATIONS

This application is related to U.S. application for patent Ser. No. 08/710,346, filed Sep. 16, 1996, entitled "Optimized Routing of Mobile Calls Within A Telecommunications Network" (Docket No. 27943/96), to U.S. application for patent Ser. No. 08/710,347, filed Sep. 16, 1996, entitled "Optimized Routing Of Terminating Calls Within A Mobile Telecommunications Network" (Docket No. 27943/98), and to U.S. application for patent Ser. No. 08/710,345 filed Sep. 16, 1996, entitled "Using Local Number Portability Database To Solve Call Tromboning" (Docket No. 27943/101), all filed concurrently herewith and the contents of such applications are incorporated by reference herein.

BACKGROUND OF THE INVENTION

1. Technical Field of the Invention

The present invention relates to a telecommunications network and, in particular, to the optimal routing of terminating calls towards roaming mobile subscribers within a telecommunications network.

2. Description of Related Art

With the advent and development of mobile telecommunications systems, telecommunications users are no longer physically bound to wireline terminals or fixed locations for telecommunications network communications. Using the added capabilities of roaming and interoffice handoffs, mobile subscribers may travel between multiple Public Land Mobile Networks (PLMNs) utilizing the same telephone number and the same mobile station to originate outgoing calls and to receive incoming calls. Thus, a mobile subscriber may access telecommunications service from multiple locations utilizing multiple service providers with any incurred fees being charged to a single subscription. Furthermore, calling parties do not necessarily have to know where the mobile subscriber is physically located in order to establish a call connection. Data signals between visitor location registers (VLRs) and a home location register (HLR) automatically update and store subscriber information, in particular subscriber location information, enabling the network to reroute incoming calls to the appropriate mobile switching center (MSC) serving the roaming mobile subscriber. Furthermore, regardless of which MSC is currently serving the mobile station, the VLR associated with the serving MSC communicates with the HLR assigned to the mobile station to retrieve the requisite subscriber data, including subscriber feature data and billing data, and provides uniform mobile service to the mobile station.

Conventionally, if a mobile station associated with a New York (N.Y.) mobile telecommunications network is traveling in Los Angeles (L.A.), an incoming call towards the roaming mobile station is first routed to the gateway mobile switching center (GMSC) serving the N.Y. public land mobile network (PLMN) associated with the mobile station. Thereinafter, the N.Y. GMSC performs an interrogation with the home location register (HLR) associated with the mobile station to determine the current location of the roaming mobile station. Upon determining the identity of the L.A. mobile switching center (MSC) currently serving the N.Y. mobile station, the received incoming call is rerouted by the N.Y. GMSC to the serving L.A. MSC to enable a speech connection between the calling party terminal and the roaming mobile station.

Accordingly, if the calling party is originating a call setup signal from L.A., a first trunk call connection between the L.A. telecommunications network and the GMSC serving the home PLMN is initially established and then a second trunk call connection between the GMSC back to the L.A. MSC currently serving the mobile station is established. As a result, a "tromboning" of trunk call connections through N.Y. is performed in order to establish a call connection between the two telecommunications subscribers both located in L.A.

Such "tromboning" trunk call connections are disadvantageous for a number of reasons. First, unnecessary trunk connections have to be established and maintained in order to enable two subscribers who are locally located to communicate with each other and result in unnecessary seizure of valuable network resources. Additionally, even though the called party mobile station is receiving an incoming call from a calling party terminal located within the same local access transport area (LATA), such as L.A., the called party mobile station has to incur long distance charges for forwarding the call connection from his or her home PLMN back to the visited PLMN. Furthermore, the calling party also has to incur long distance charges to N.Y. for calling another mobile station located within the same PLMN.

Accordingly, there is a need for a mechanism to enable the serving mobile telecommunications network to perform optimal routing of a mobile call towards a roaming mobile station.

SUMMARY OF THE INVENTION

The present invention discloses a method and system for optimally routing a call connection within a mobile telecommunications network. A telecommunications subscriber requesting an outgoing call connection towards a mobile station informs the serving telecommunications node that the called party is a mobile station. In response, the serving telecommunications node analyzes the received directory number representing the called mobile station to identify the home location register (HLR) associated with the called mobile station and then interrogates the identified HLR directly to acquire a roaming number. The roaming number received from the HLR identifies the mobile switching center (MSC) currently serving the called mobile station. Utilizing the received roaming number as the called party number, the originating telecommunications node originates an outgoing call directly towards the serving MSC. The serving MSC, in turn, establishes a speech connection with the called mobile station traveling within its coverage area.

As an embodiment of the present invention, the HLR interrogation is performed by a gateway mobile switching center (GMSC) associated with the originating telecommunications node. As another embodiment of the present invention, the HLR interrogation is performed by a mobile switching center (MSC) associated with the calling party terminal.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

Figure 1:
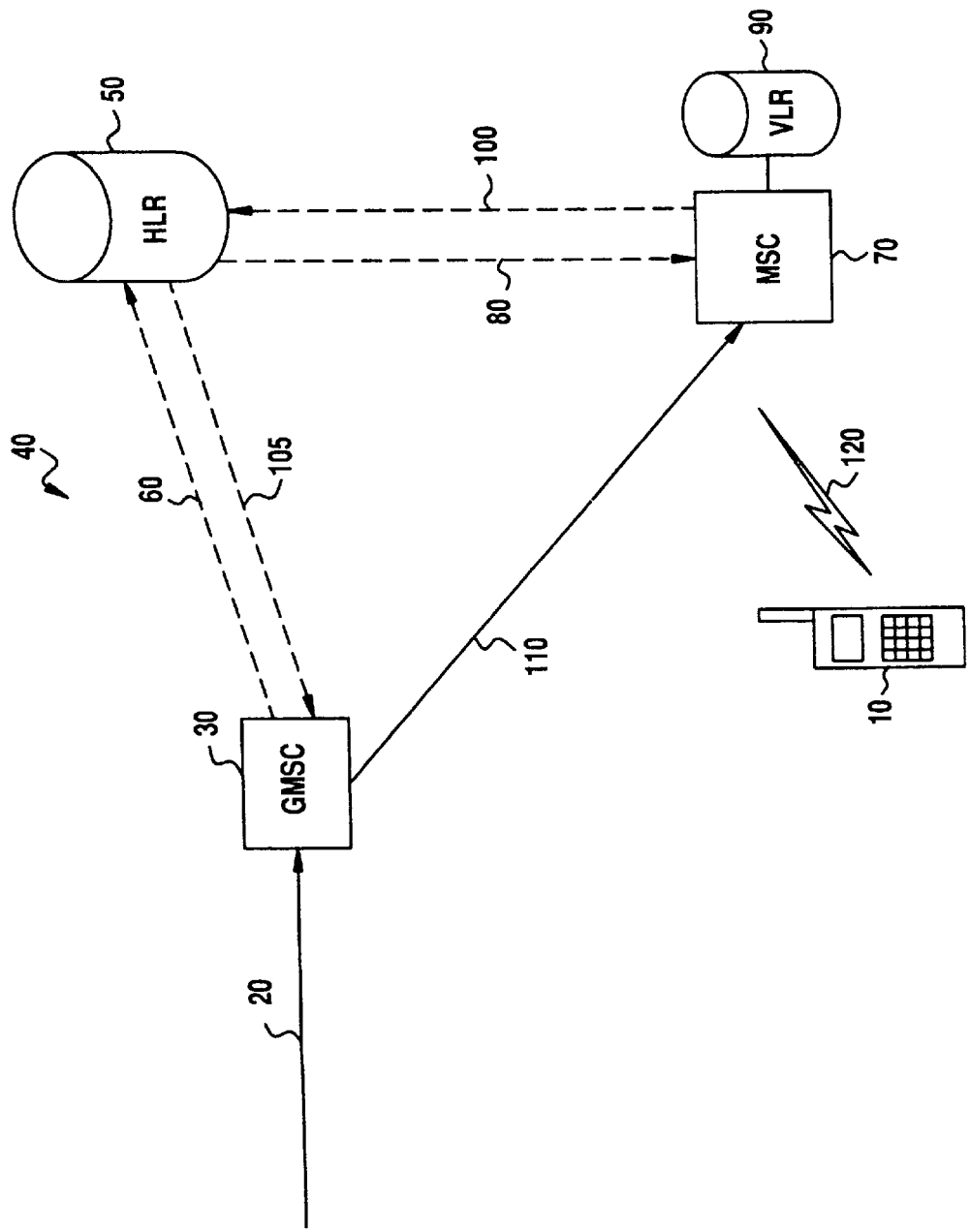
FIG. 1 is a block diagram of a mobile telecommunications network illustrating the routing of an incoming call to a destination mobile station.

FIG. 1 is a block diagram of a telecommunications network illustrating a mobile telecommunications network routing an incoming call to a destination mobile station 10. Whenever a telecommunications subscriber (mobile or wireline) originates a call connection by dialing a directory number, such as a Mobile Subscriber Integrated Service Digital Network (MSISDN) number, associated with the mobile station 10, a call setup signal 20, such as an Initial Address Message (IAM), is received by the gateway mobile switching center (GMSC) 30 serving the public land mobile network (PLMN) 40 associated with the destination mobile station 10. Whenever the IAM signal 20 is received by a particular telecommunications node, such as the GMSC 30, a corresponding call connection (i.e., trunk call connection) is further established between the originating telecommunications node and the receiving telecommunications node.

Because the mobile station 10 is not restricted to one particular location or PLMN, the GMSC 30 receiving the IAM signal needs to interrogate the home location register (HLR) 50 associated with the mobile station 10 to determine the current location of the mobile station 10. Accordingly, a signal 60 requesting routing instructions is transmitted from the GMSC 30 to the HLR 50. The HLR, in turn, determines the identity of the mobile switching center (MSC) 70 currently serving the mobile station 10 and further transmits a signal 80 requesting a roaming number to the identified MSC 70. With the help of subscriber data stored at an attached visitor location register (VLR) 90, the serving MSC 70 identifies the called mobile station 10 traveling within its coverage area and, as a result, returns the roaming number representing the called mobile station located within the serving MSC 70 to the HLR 50 (signal 100). The HLR 50 then forwards the received roaming number back to the GMSC 30 (signal 105). By utilizing the received roaming number identifying the serving MSC 70, the GMSC 30 reroutes the received call setup signal 20 to the serving MSC 70. Accordingly, a call connection 110, such as a trunk connection, is established from the GMSC 30 to the serving MSC 70. Once the rerouted call setup signal is received by the serving MSC 70, the mobile station 10 is paged and a call connection 120 over a radio channel between the mobile station 10 and the serving MSC 70 is established.

Figure 2:
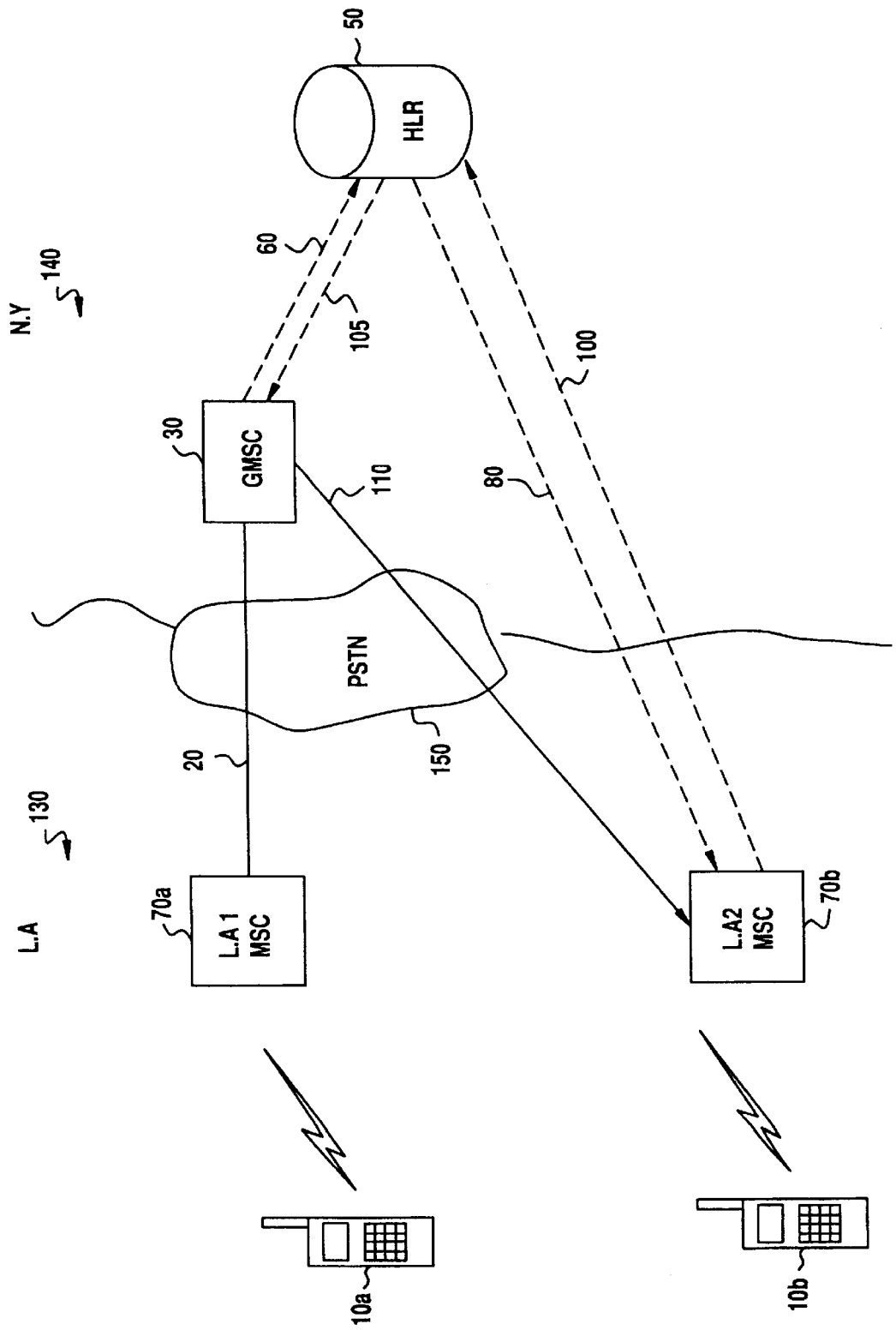
FIG. 2 is a block diagram of a telecommunications network illustrating the tromboning of trunk connections to establish a call connection between a calling party terminal and a roaming called party mobile station.

Due to such HLR interrogation and rerouting of the incoming call by a serving GMSC, inefficient and wasteful call connections are often times established towards a roaming mobile station. Reference is now made to FIG. 2 illustrating the "tromboning" of trunk connections within a telecommunications network to establish a call connection between a calling party terminal 10a and a roaming called party mobile station 10b. The called party mobile station 10b is associated with the N.Y. PLMN 140 and is currently roaming within the visited L.A. PLMN 130. When the mobile station 10a, also located within the L.A. PLMN 130, originates an outgoing call connection towards the called party mobile station 10b, a call setup signal is originated by the L.A. MSC 70a serving the calling party mobile station 10a. The originated call setup signal, such as an IAM signal, is then routed through the connected Public Switched Telephone Network (PSTN) 150 and delivered to the GMSC 30 serving the N.Y. PLMN 140. Accordingly, a first trunk call connection, as illustrated by a solid line 20, is established between the first L.A. MSC 70a and the GMSC 30. As described above in connection with FIG. 1, the GMSC 30 then performs HLR interrogation by transmitting a connection-less signal 60 towards the HLR 50. In order to retrieve a network number that can be utilized by the GMSC 20 to reroute the incoming call, the HLR 50 requests a roaming number from the serving MSC 70b. Because the MSC 70b serving the called party mobile station lob is another MSC located within the L.A. PLMN 130 (hereinafter called the second L.A. MSC 70b), a Mobile Application Part (MAP) based signal 80 is sent from the N.Y. HLR 50 to the second L.A. MSC 70b. The second L.A. MSC 70b then returns the roaming number back to the HLR 50 via another MAP based signal 100. The received MAP based signal is then transmitted back to the GMSC 30 via signal 105. Utilizing the received roaming number identifying the second L.A. MSC 70b as the MSC currently serving the mobile station 10b, the GMSC 30 reroutes the call setup signal to the second L.A. MSC 70b. Such a rerouting creates a second trunk call connection 110 between the GMSC 30 and the second L.A. MSC 70b.

A speech connection between the calling party mobile station 10a in Los Angeles and the called party mobile station 10b also in Los Angeles, via the New York GMSC 30, is thus established using the first call connection 20 and the second call connection 110. Such a "tromboning" of trunk call connections is conventionally unavoidable because the current location of the called party mobile station 10b cannot be determined until the call setup signal reaches the GMSC 30. Unfortunately, tromboning of trunk call connections are wasteful and inefficient. It further forces mobile subscribers to incur additional fees for rerouting incoming calls from their home PLMN to the visited PLMN. Furthermore, it forces calling parties to incur unnecessary long distance charges.

Figure 3:
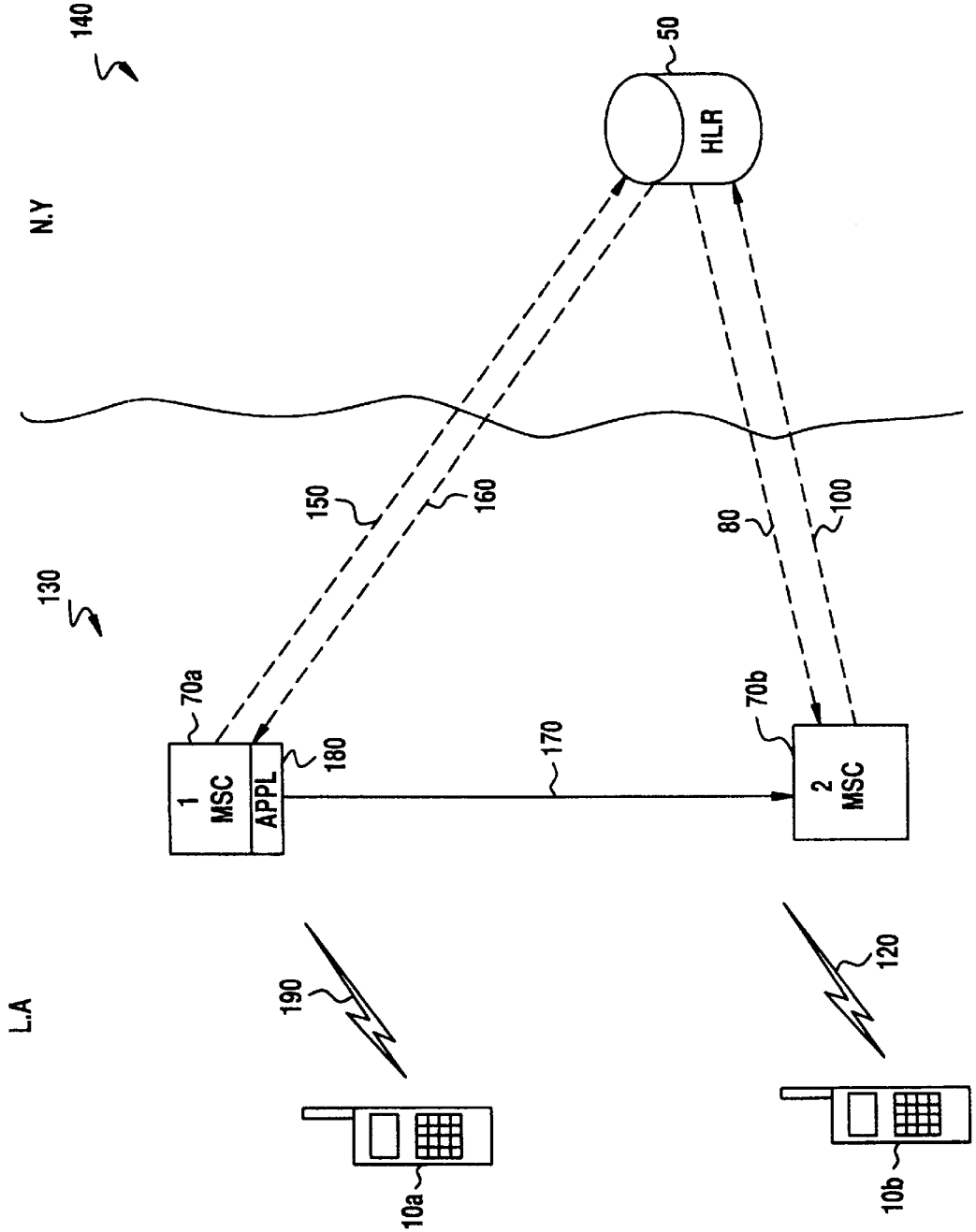
FIG. 3 is a block diagram of a mobile telecommunications network illustrating the optimal routing of a call connection by an originating mobile switching center (MSC)
Figure 4:
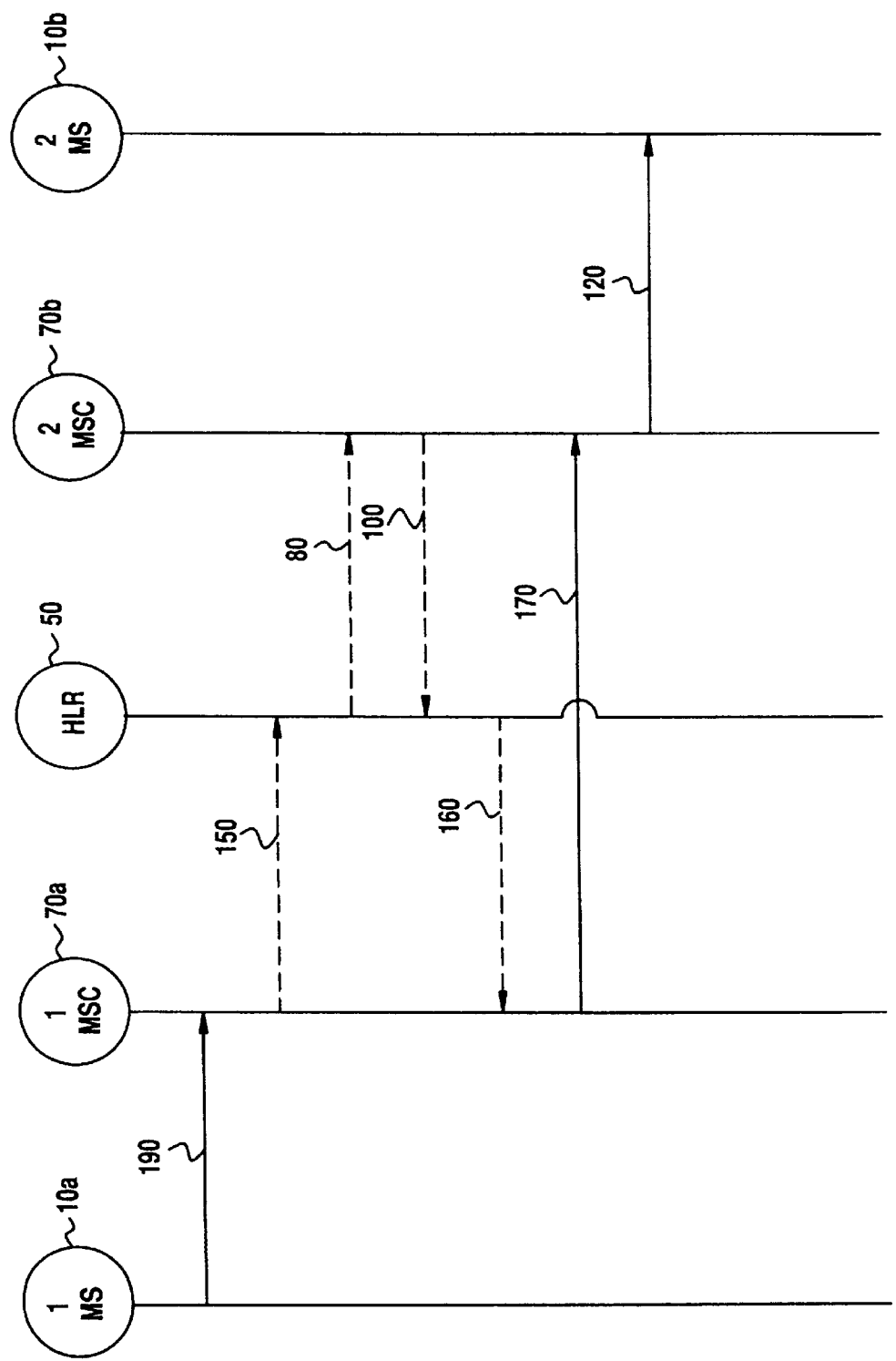
FIG. 4 is a signal sequence diagram illustrating the optimal routing of a call connection by an originating MSC within a mobile telecommunications network.

Reference is now made to both FIGS. 3 and 4 illustrating the optimized routing of a call connection by an originating mobile switching center (MSC) within a mobile telecommunications network. A called party mobile station 10b is associated with the N.Y. PLMN 140 and is currently traveling within the L.A. PLMN 130. The calling party mobile station 10a, also located within the L.A. PLMN 130, transmits a service code followed by a directory number representing the called party mobile station 10b to the first MSC 70a serving the calling party mobile station. The service code entered by the calling party mobile station 10a informs the first MSC 70a that the dialed directory number represents a mobile number. In response, an application module 180 associated with the first MSC 70a analyzes the received directory number, such as a Mobile Subscriber Integrated Service Digital Number (MSISDN), and determines the home location register (HLR) located within the N.Y. PLMN 140 and associated with the called party mobile station 10b. Because a series of MSISDN numbers are typically pre-assigned to a particular HLR, by analyzing and utilizing the received MSISDN number as the called party address, a signal can be routed to the HLR associated with that particular MSISDN number. Accordingly, the first MSC 70a transmits a connection-less signal, such as a Mobile Application Part (MAP) based signal 150, directly to the identified HLR 50. The transmitted MAP based signal further includes a network address representing the first MSC 70a as the calling party address.

In a manner similar to the conventional HLR interrogation as described in FIG. 1, the HLR 50 then transmits a signal 80 requesting a roaming number from a second MSC 70b currently serving the called party mobile station 10b. The second MSC 70b then returns the roaming number back to the requesting HLR via signal 100. The HLR 50, not knowing that the interrogation has been performed by another MSC, forwards the received roaming number back to the first MSC 70a by utilizing the calling party address received from the previous MAP based signal 150 as the called party address in another MAP based signal 160. After receiving the roaming number identifying the second MSC 70b currently serving the called party mobile station 10b, the first MSC 70a originates an outgoing call connection directly towards the second MSC 70b using the received roaming number as the called party number. The MSISDN number representing the called party mobile station 10b is further included in the transmitted outgoing IAM signal. Accordingly, a call connection (i.e., trunk call connection) is directly established between the first MSC 70a and the second MSC 70b both located within L.A. The second MSC 70b, in turn, pages the called party mobile station 10b and establishes a speech connection 120 over a radio connection.

Since communicating connection-less signals, such as MAP based signals, does not tie up valuable network trunk resources, by directly interrogating the HLR associated with the called party mobile station 10b by the first MSC 70a, a more optimal and efficient trunk call connection 170 can be established between the two locally located mobile stations. Furthermore, for the most optimal case, if both mobile stations are being served by the same MSC, no trunk resource is needed to establish the speech connection. After receiving a roaming number from the HLR 50, the first MSC 70a determines that the received roaming number represents itself, and internally establishes a call connection with the called party mobile station 10b located within its coverage area.

Figure 5:
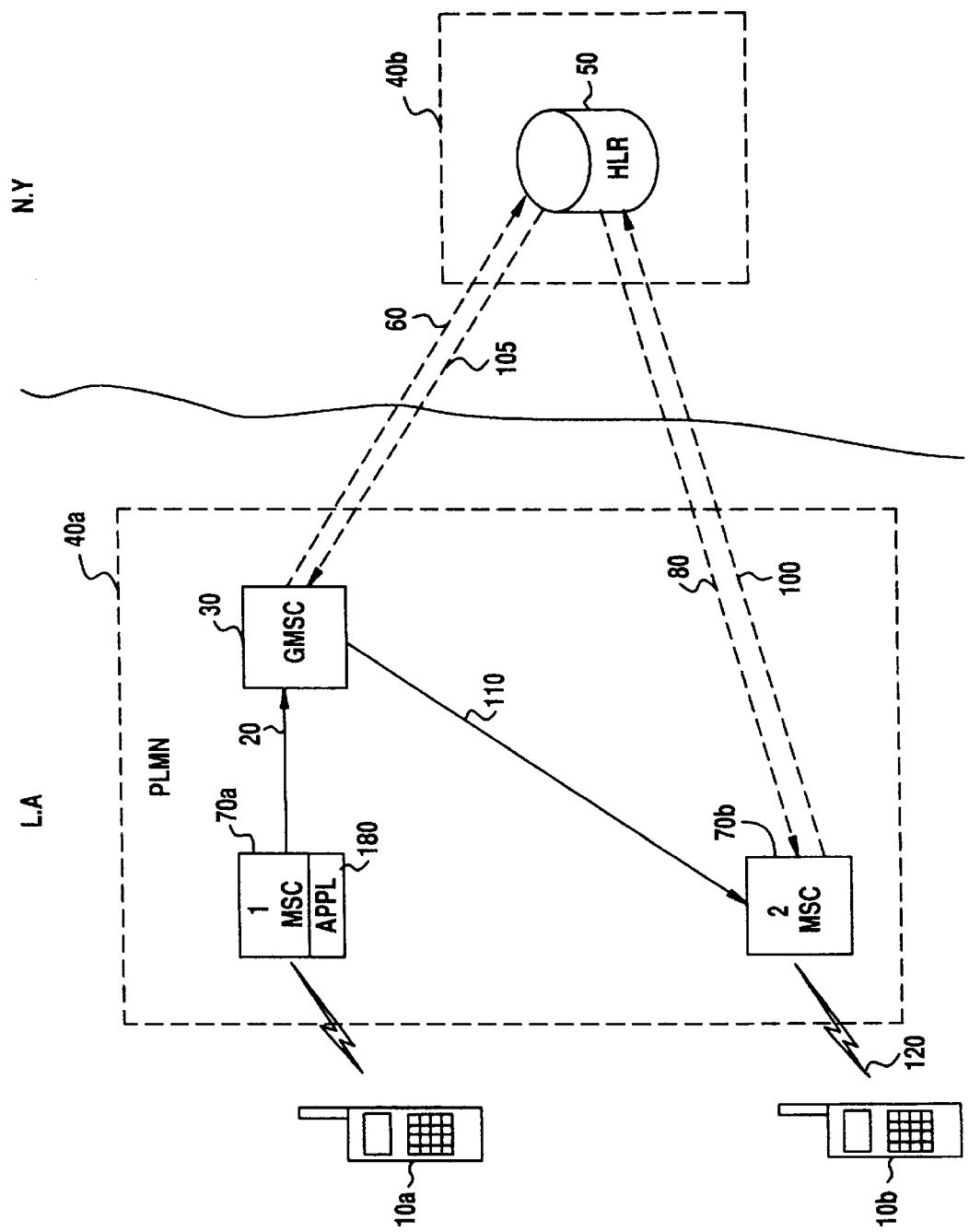
FIG. 5 is a block diagram of a mobile telecommunications network illustrating the optimal routing of a call connection by an gateway mobile switching center (GMSC) associated with the originating MSC.

As another embodiment of the present invention, reference is now made to FIG. 5 illustrating the optimal routing of a call connection by a gateway mobile switching center (GMSC) 30 associated with the first MSC 70a serving the calling party mobile station 10a. When the originating MSC 70a does not have the capability to interrogate an HLR directly, upon determining that the received directory number represents a mobile station, the application module 180 within the first MSC 70a originates an outgoing call connection 20 to the L.A. GMSC 30 serving the same PLMN 40a. The L.A. GMSC 30, in turn, interrogates the HLR 50 associated with the called party mobile station 10b and located within the N.Y. PLMN 40b. As described above in connection with FIG. 3, the L.A. GMSC 30 then transmits a connection-less signal 60, such as a MAP based signal, requesting routing instruction to the HLR 50. The HLR 50, in turn, sends another connection-less signal 80 to the second MSC 70b currently serving the called party mobile station 10b requesting a roaming number. The roaming number is transmitted by the second MSC 70b back to the HLR 50 via another connection-less signal 100. The HLR 50 then forwards the received roaming number to the L.A. GMSC 30 via yet another connection-less signal 105. The L.A. GMSC 30 then reroutes the call connection directly to the second MSC 40b identified by the received roaming number and establishes a trunk call connection 110 between the GMSC 30 and the second MSC 70b. The second MSC 70b then pages the called party mobile station 10b and establishes a speech connection 120.

If both MSCs are associated with the same PLMN, no long distance charges are incurred by both parties to locally establish a call connection. If the called party mobile station is traveling within a different PLMN, a long distance charge that would be lower than the "tromboning" call connection charge to N.Y. would be incurred. Lastly, for the most optimal case, if both mobile stations 10a–10b are being served by the same MSC, the GMSC 30 reroutes the call connection back to the first MSC 70a to internally switch the call connection and to establish a speech connection with the called party mobile station 10b traveling within its coverage area.

Figure 6:
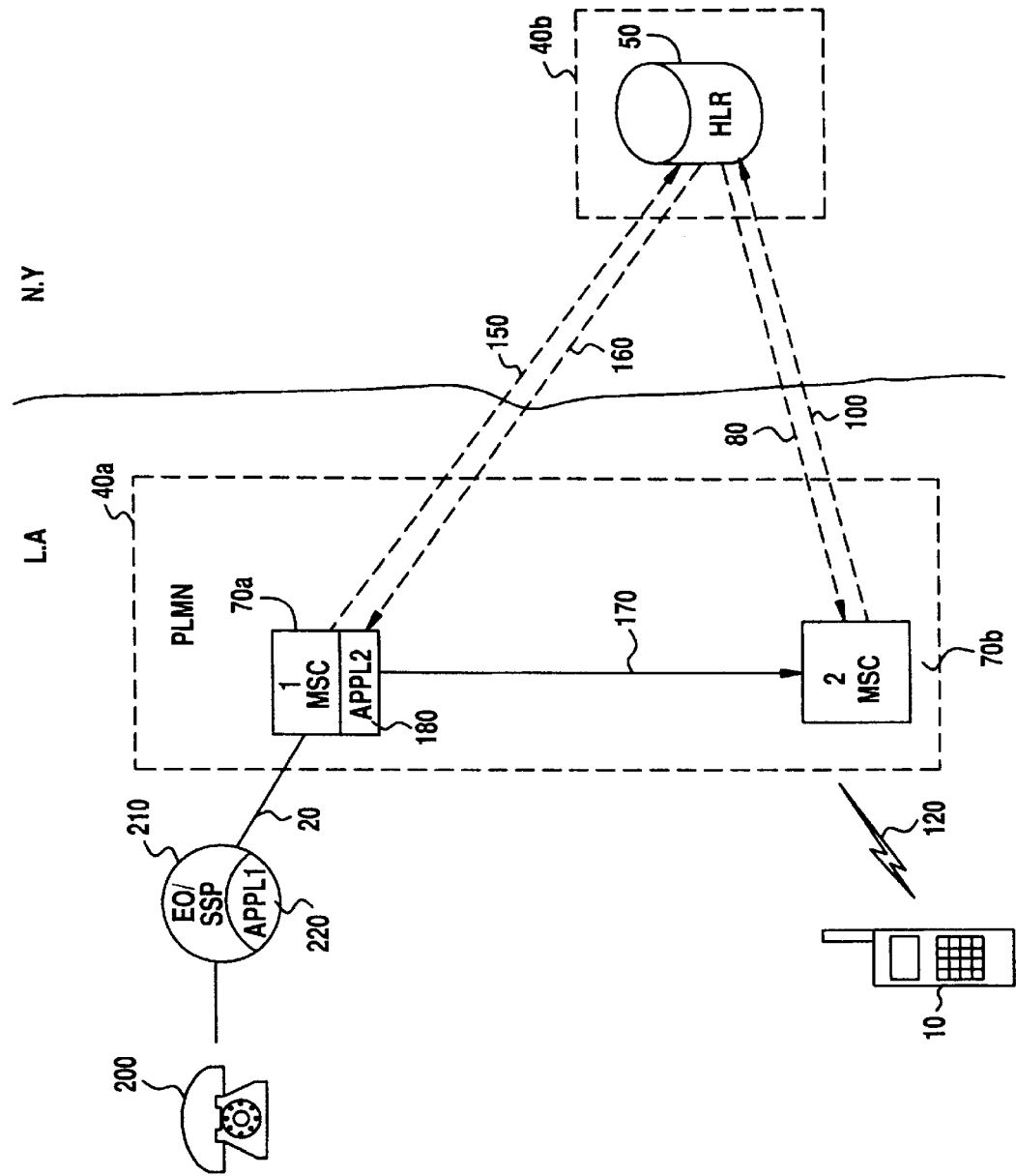
FIG. 6 is a block diagram of a telecommunications network illustrating the optimal routing of a call connection by a MSC associated with a wireline local exchange connected to the calling party terminal.
Figure 7:
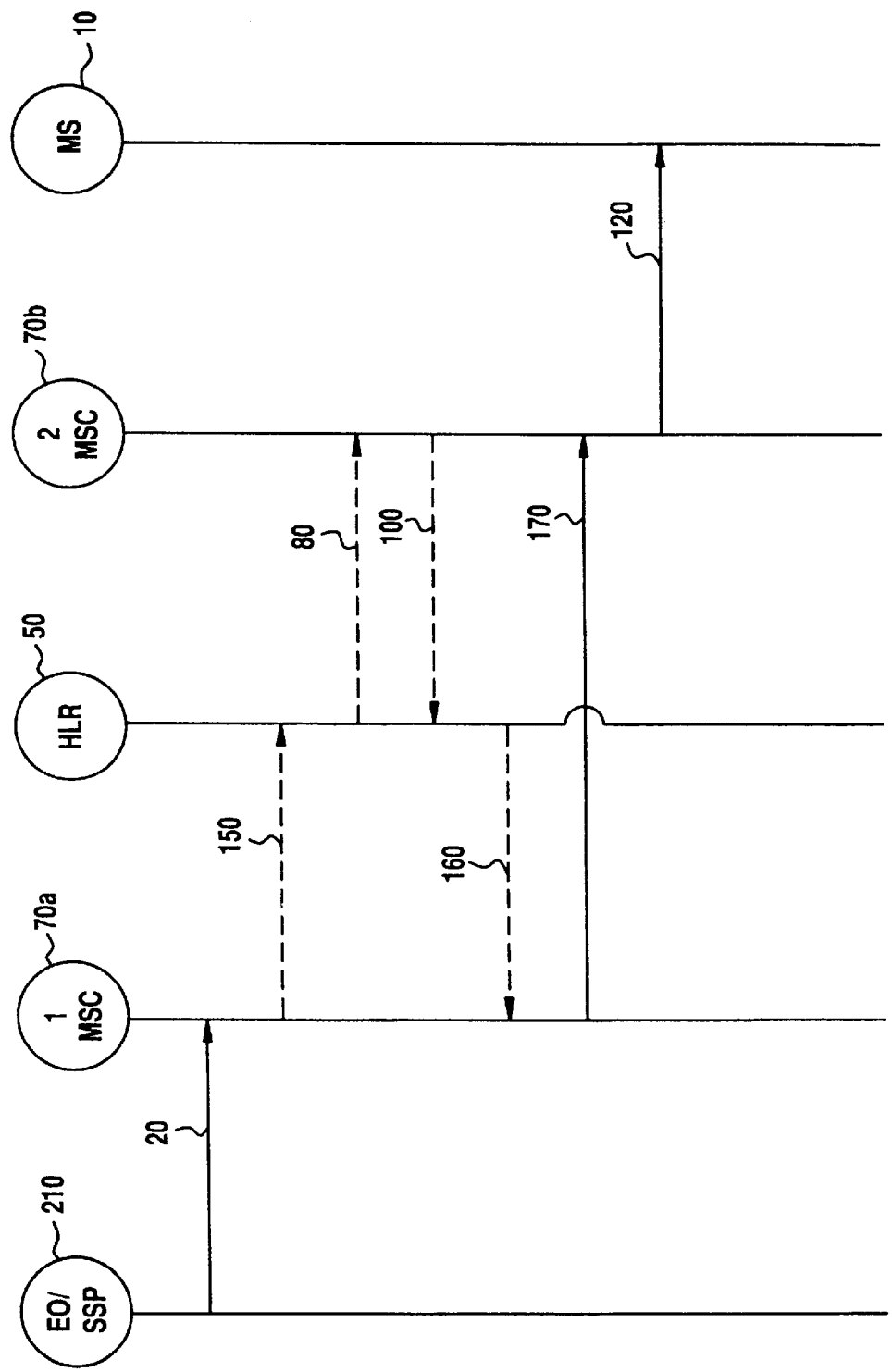
FIG. 7 is a signal sequence diagram illustrating the optimal routing of a call connection by a MSC associated with a wireline local exchange connected to the calling party terminal within a telecommunications network.

Reference is now made to both FIGS. 6 and 7 illustrating the optimal routing of a call connection by an MSC associated with a wireline local exchange connected to the calling party terminal. A wireline terminal 200 connected to a wireline local exchange 210 located within a L.A. Public Switched Telephone Network (PSTN) requests a call connection towards a called party mobile station 10 by dialing a service code followed by a directory number representing the mobile station 10. The wireline local exchange includes a conventional end office. It may also be a Service Switching Point (SSP) within an Intelligent Network (IN).

An application module 220 associated with the local exchange 210 determines that the directory number entered by the wireline terminal 200 constitutes a mobile number and originates a call connection towards a first mobile switching center located within the neighboring PLMN 40, such as the L.A. PLMN. Since a wireline local exchange does not usually have any MAP capabilities, the HLR interrogation has to be performed by one of the mobile telecommunications node located closely to the originating wireline local exchange.

After receiving the call connection 20 from the local exchange 210, an application module 180 within the first MSC 70a determines that it is an "optimized" call being initiated by a neighboring wireline local exchange 210 and transmits a connection-less signal 150 towards the HLR 50 associated with the received MSISDN number and located within the N.Y. PLMN. The HLR 50 located within the N.Y. PLMN then transmits a connection-less signal 80 towards a second MSC 70b currently serving the called party mobile station 10. The requested roaming number is transmitted back to the HLR (signal 80) and accordingly forwarded to the first MSC 70a (signal 160). Utilizing the received roaming number identifying the second MSC 70b currently serving the called party mobile station 10, the first MSC 70a forwards the received call setup signal, such as an IAM signal, to the indicated second MSC 70b. Accordingly, a trunk call connection 170 is established between the first MSC 70*a* and the second MSC 70*b*. The second MSC 70*b* then establishes a speech connection 120 with the called party mobile station 10 located within its coverage area. Again, the first and second MSC could be located within the same PLMN or located separately within two different PLMNs. Furthermore, the called party mobile station might be served by the first MSC receiving the call setup signal from the wireline local exchange.

Figure 8:
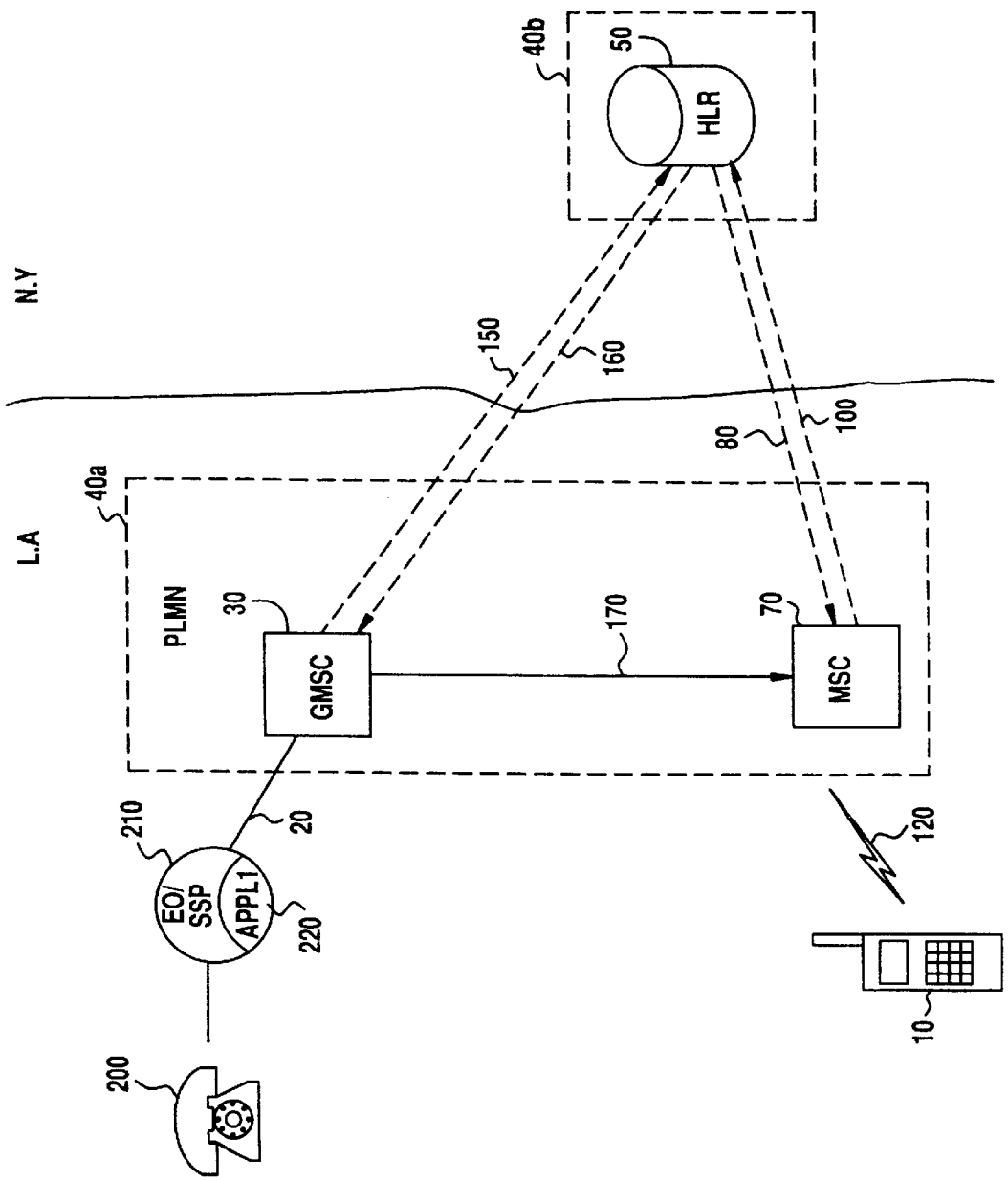
FIG. 8 is a block diagram of a telecommunications network illustrating the optimal routing of a call connection by a gateway mobile switching center (GMSC) associated with a wireline local exchange connected to the calling party terminal.

As another embodiment of the present invention, reference is now made to FIG. 8 illustrating the optimal routing of a call connection by a GMSC associated with a wireline local exchange within the L.A. PSTN connected to the calling party terminal. Upon determining that the directory number specified by the wireline terminal 200 is a mobile number, the application module 220 within the local exchange 210 originates a call setup signal towards a L.A. GMSC 30 associated with a neighboring PLMN 40*a*, e.g., L.A. PLMN. As a result, a trunk connection 20 is established between the local exchange 210 and the L.A. GMSC 30. The L.A. GMSC 30 located within the L.A. PLMN 40*a* then sends a connection-less signal 150 to the HLR 50 located within the N.Y. PLMN 40*b* requesting routing instruction. The HLR 50 then communicates with MSC 70 currently serving the called party mobile station 10 to acquire a roaming number (signals 80 and 100) and forwards the acquired roaming number to the L.A. GMSC 30. The L.A. GMSC 30 then reroutes the received call setup signal utilizing the received roaming number as the called party address. As a result, a trunk call connection 170 is established between the L.A. GMSC 30 and the serving MSC 70. The serving MSC 70 then establishes a speech connection 120 with the called party mobile station 10. Accordingly, even if a wireline terminal is originating a call connection towards a mobile station visiting from N.Y., no trunk connections have to be unnecessary established between the L.A. telecommunications network to the N.Y. telecommunications network and then back to the L.A. telecommunications again.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A method for optimally connecting a call from a calling mobile station served by an originating mobile switching center (MSC) within a first Public Land Mobile Network (PLMN) to a called mobile station associated with a second PLMN, said called mobile station currently being located within said first PLMN, said method comprising the steps of:

dialing a service code followed by a directory number associated with said mobile station by said calling mobile station;

receiving said dialed service code and said dialed directory number at said originating MSC within said first PLMN, said received service code indicating that said directory number is a mobile station number;

identifying, by said originating MSC, in response to said service code, a home location register (HLR) associated with said called mobile station, said HLR being located within said second PLMN;

interrogating, by said originating mobile switching center, said home location register (HLR) to determine a destination MSC currently serving said called mobile station, said destination MSC being located within said first PLMN; and originating a call setup signal from said originating MSC directly towards said destination MSC, bypassing said second PLMN, to establish a call connection between said calling mobile station and said called mobile station.

2. The method of claim 1 wherein said step of interrogating said HLR further comprises the steps of:

transmitting a first connection-less signal from said originating MSC to said HLR requesting routing instruction;

transmitting a second connection-less signal from said HLR to said destination MSC requesting a roaming number in response to a receipt of said first connection-less signal;

receiving said roaming number from said destination MSC at said HLR; and forwarding said receiving roaming number from said HLR to said originating MSC.

3. The method of claim 2 wherein said step of originating said call setup signal comprises the step of originating a call setup signal using said received roaming number as a called party address.

4. The method of claim 2 wherein said first and second connection-less signals comprise mobile application part (MAP) based signals.

5. The method of claim 2, further comprising the steps of:

determining, by said originating MSC, whether said received roaming number represents said originating MSC;

if said received roaming number represents said originating MSC, establishing a speech connection directly between said originating MSC and said called mobile station to establish said call connection between said calling mobile station and said called mobile station; and if said received roaming number does not represent said originating MSC, performing said step of originating said call setup signal directly towards said destination MSC.

6. A system for optimally connecting a call from a calling mobile station served by an originating mobile switching center (MSC) within a first Public Land Mobile Network (PLMN) to a called mobile station associated with a second PLMN, said called mobile station currently being located within said first PLMN, said system comprising:

means for dialing a service code followed by a directory number associated with said called mobile station by said calling mobile station;

means for receiving said dialed service code and said directory number at said originating MSC, said received service code indicating that said directory number is a mobile station number;

means for identifying, by said originating MSC, in response to said service code, a home location register (HLR) associated with said called mobile station, said HLR being located within said second PLMN;

means for interrogating, by said originating MSC, said HLR to determine a destination MSC currently serving said mobile station, said destination MSC being located within said first PLMN; and means for originating a call setup signal from said originating MSC directly towards said destination MSC, bypassing said second PLMN, to establish a call connection between said calling mobile station and said called mobile station.

7. The system of claim 6 wherein said means for interrogating said HLR further comprise:

means for transmitting a first connection-less signal from said originating MSC to said HLR requesting routing instructions;

means for transmitting a second connection-less signal from said HLR to said destination MSC requesting a roaming number in response to receipt of said first connection-less signal;

means for receiving said roaming number from said destination MSC at said HLR; and means for forwarding said received roaming number from said HLR to said originating MSC.

8. The system of claim 7 further comprising:

means for determining, by said originating MSC, whether said received roaming number represents said originating MSC;

if said received roaming number represents said originating MSC, means for establishing a speech connection directly between said originating MSC and said called mobile station to establish said call connection between said calling mobile station and said called mobile station; and if said received roaming number does not represent said originating MSC, said means for originating said call setup signal directly towards said destination MSC being initiated.

9. The system of claim 7 wherein said first and second connection-less signals comprise mobile application part based signals.

10. The system of claim 6 wherein said means for identifying comprises an application module within said originating MSC.

* * * * *

UNITED STATES PATENT AND TRADEMARK OFFICE
CERTIFICATE OF CORRECTION

PATENT NO. : 5,991,621                      Page 1 of 1
DATED : November 23, 1999
INVENTOR(S) : Vladimir Alperovich It is certified that error appears in the above-identified patent and that said Letters Patent is hereby corrected as shown below:

<u>Column 4,</u>
Line 30, replace "lob", with -- 10b --

Signed and Sealed this

Twenty-eighth Day of August, 2001

*Attest:*

NICHOLAS P. GODICI
*Attesting Officer*     *Acting Director of the United States Patent and Trademark Office*